(12) United States Patent
Vandersnick

(10) Patent No.: US 7,631,607 B2
(45) Date of Patent: Dec. 15, 2009

(54) AGRICULTURAL SEEDING SYSTEM

(75) Inventor: Todd E. Vandersnick, Geneseo, IL (US)

(73) Assignee: Deere & Company, Moline, IL (US)

( * ) Notice: Subject to any disclaimer, the term of this patent is extended or adjusted under 35 U.S.C. 154(b) by 175 days.

(21) Appl. No.: 11/828,131

(22) Filed: Jul. 25, 2007

(65) Prior Publication Data

US 2009/0025619 A1    Jan. 29, 2009

(51) Int. Cl.
  *A01B 61/00*    (2006.01)
  *A01C 5/00*    (2006.01)
  *A01C 13/00*    (2006.01)
  *A01C 15/00*    (2006.01)
(52) U.S. Cl. .................. 111/193; 111/195; 111/200; 111/926; 172/264
(58) Field of Classification Search ......... 172/261–269; 111/190–196, 200, 926
  See application file for complete search history.

(56) References Cited

U.S. PATENT DOCUMENTS

| 3,414,252 | A | 12/1968 | Frager et al. .................. 267/1 |
| 3,575,243 | A | 4/1971 | Mark et al. .................. 172/710 |
| 4,579,071 | A | 4/1986 | Johnson |
| 4,977,841 | A | 12/1990 | Truax .......................... 111/62 |
| 5,279,236 | A | 1/1994 | Truax .......................... 111/139 |
| 6,454,019 | B1 | 9/2002 | Prairie et al. ................. 172/677 |
| 6,752,094 | B1 | 6/2004 | Truax .......................... 111/135 |
| 7,086,214 | B2 | 8/2006 | Thompson et al. ........... 56/14.7 |

FOREIGN PATENT DOCUMENTS

| EP | 1911340 A1 | 4/2008 |
| WO | 9831210 A1 | 7/1998 |

OTHER PUBLICATIONS

European Search Report Application No. 08159311.3-1260 Nov. 19, 2008.

*Primary Examiner*—Christopher J. Novosad
(74) *Attorney, Agent, or Firm*—Taylor & Aust, P.C.

(57) ABSTRACT

An agricultural seeding machine including at least one tool bar and a plurality of row units attached to the tool bar. Each row unit including a frame, a plurality of ground engaging wheels including a first ground engaging wheel, at least one suspension structure and a torsional biasing device. The at least one suspension structure including a first suspension structure having a first end and a second end. The first end rotatably coupled to the first ground engaging wheel. The torsional biasing device coupled to the second end of the first suspension structure. The biasing device being carried by the frame.

17 Claims, 4 Drawing Sheets

AGRICULTURAL SEEDING SYSTEM

FIELD OF THE INVENTION

The present invention relates to an agricultural seeding machine, and, more particularly, to a gauging and closing wheel system associated with a row unit of an agricultural seeding machine

BACKGROUND OF THE INVENTION

An agricultural seeding machine, such as a row crop planter or grain drill, places the seed at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame, which is movably coupled with a tool bar. The frame may carry a main seed hopper, herbicide hopper and insecticide hopper. If a granular herbicide and insecticide are used, the metering mechanisms associated therewith for the dispensing of the granular product into the seed trench are relatively simple. On the other hand, mechanisms necessary to properly meter seeds at a predetermined rate and to place the seeds at a predetermined relative locations and depth within the seed trench are relatively complicated.

The mechanisms associated with the metering and placing of the seeds generally can be divided into a seed metering system and a seed placement system, which are in communication with each other. The seed metering system receives the seeds in a bulk manner from a seed hopper carried by the frame. Different types of seed metering systems can be used such as seed plates, finger plates and seed disk. In the case of a seed disk metering system, a seed disk is formed with a plurality of seed cells spaced about the periphery thereof. Seeds are moved into the seed cells with one or more seeds in each seed cell depending upon the size and configuration of the seed cell. A vacuum or positive pressure airflow may be used in conjunction with the seed disk to assist in movement and retention of the seeds in the seed cells. The seeds are singulated and discharged at a predetermined rate to the seed placement system.

The seed placement system may be categorized as a gravity drop system or a power drop system. In the case of a gravity drop system, a seed tube has an inlet end, which is positioned below the seed metering system. The singulated seeds from the seed metering system merely drop into the seed tube and fall by way of gravitational force from a discharge end thereof into the seed trench. The seed tube may be curved in a rearward manner to assist in directing the seed into the seed trench. The rearward curvature also assists in reducing bouncing of the seeds back and forth within the tube as it falls into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide somewhat consistent placement of the seeds along a predetermined path at a desired spacing.

Gauging and closing wheels are connected to the row unit frame and respectively provide for the gauging of the depth of the opening disk and for the positioning of the closing wheels. By setting the positions of the opening disk and closing wheels the depth of the seeding trench and the appropriate closing of the seeding trench can be controlled. A problem with closing wheel systems is that they require considerable structure behind the gauge wheels for adequate support of the positioning system of the closing wheels.

What is needed in the art is a closing wheel system that reduces structure required to position and properly tension the closing wheels.

SUMMARY OF THE INVENTION

The invention includes an agricultural seeding machine including at least one tool bar and a plurality of row units attached to the tool bar. Each row unit including a frame, a plurality of ground engaging wheels including a first ground engaging wheel, at least one suspension structure and a torsional biasing device. The at least one suspension structure including a first suspension structure having a first end and a second end. The first end rotatably coupled to the first ground engaging wheel. The torsional biasing device coupled to the second end of the first suspension structure. The biasing device being carried by the frame.

DETAILED DESCRIPTION OF THE INVENTION

Figure 1:
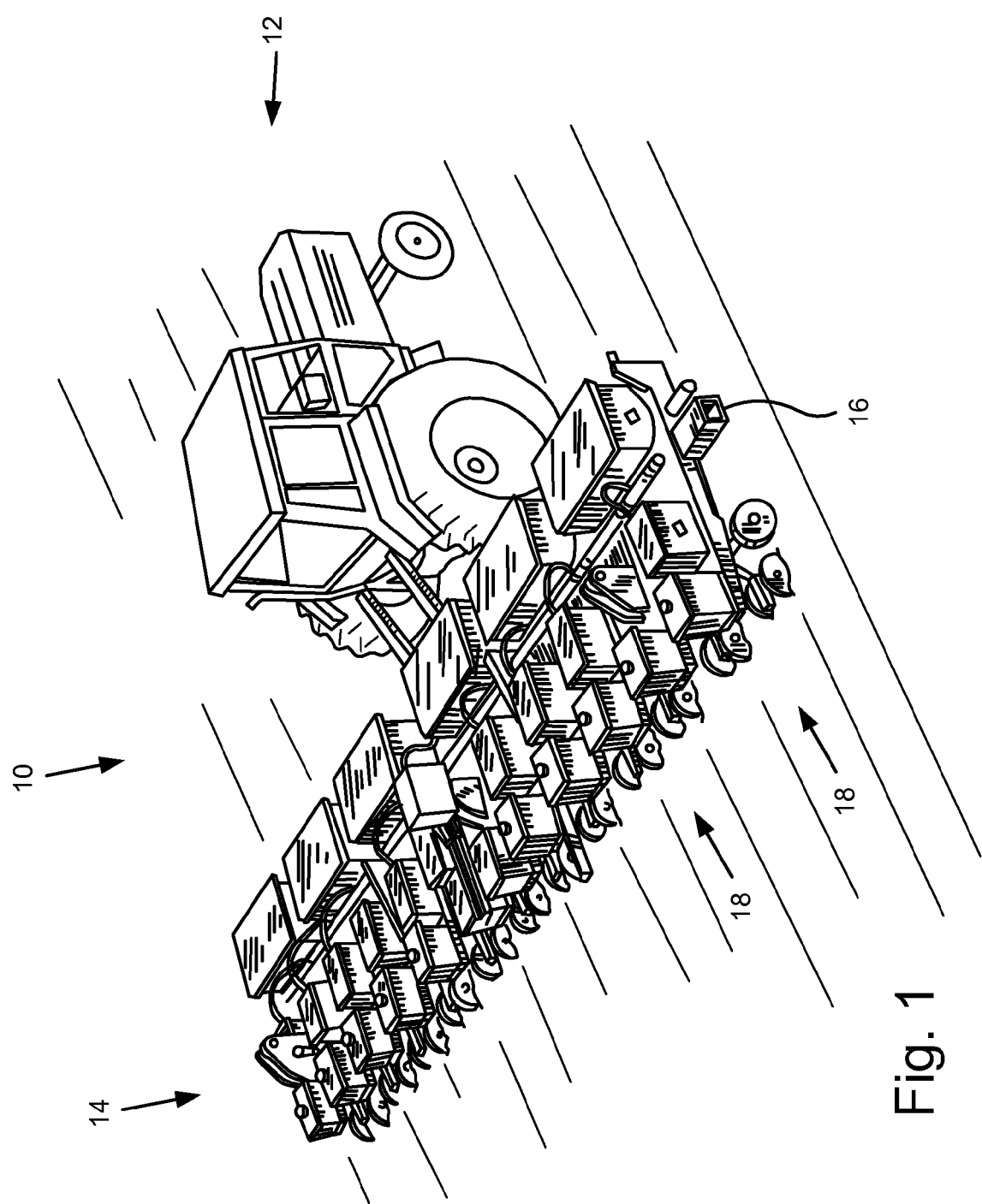
FIG. 1 is a perspective view of an agricultural seeding machine incorporating an embodiment of the closing system of the present invention.
Figure 2:
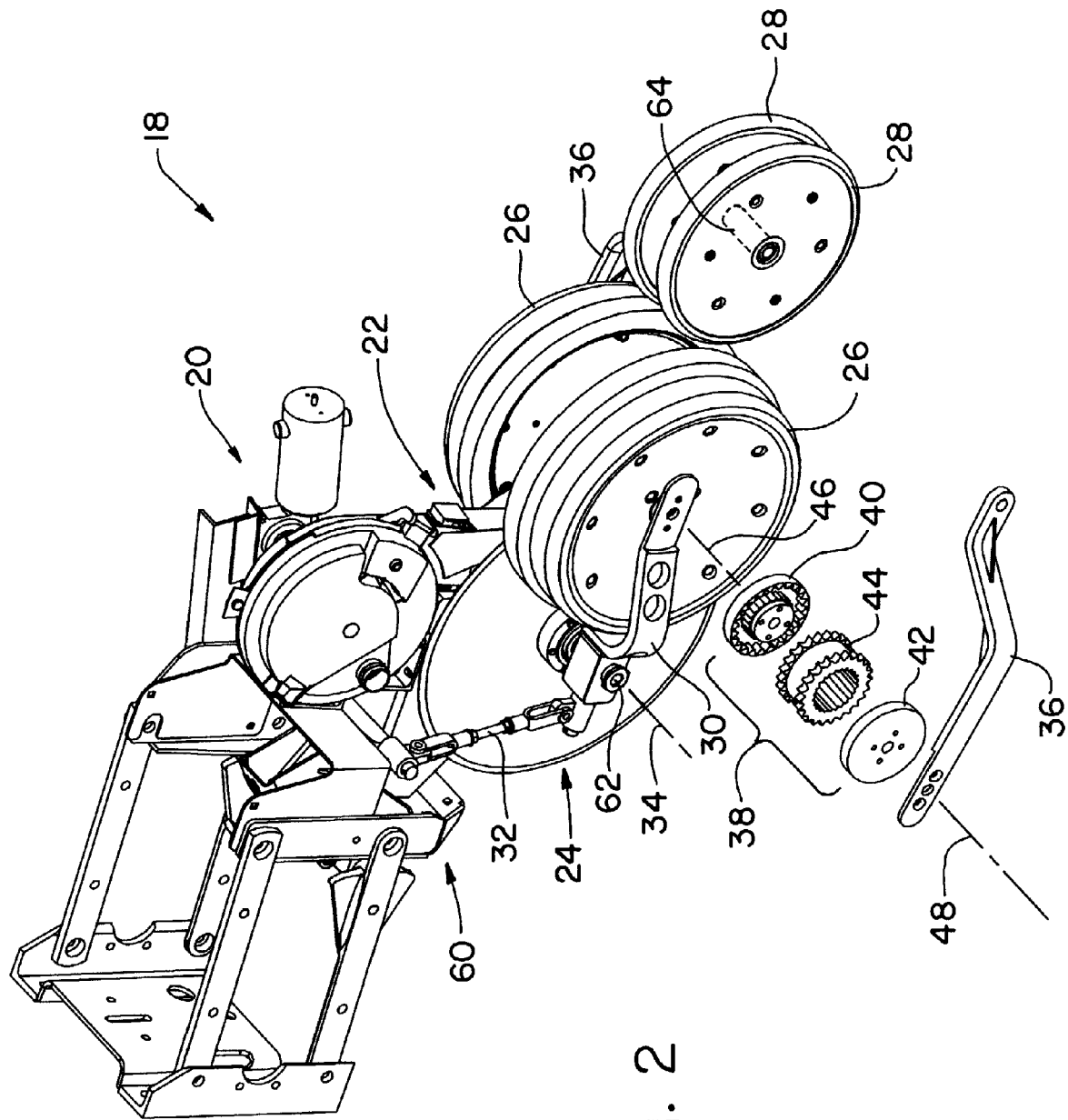
FIG. 2 is a perspective, partially exploded view illustrating the gauging and closing system of a row unit of the seeding machine of FIG. 1.
Figure 3:
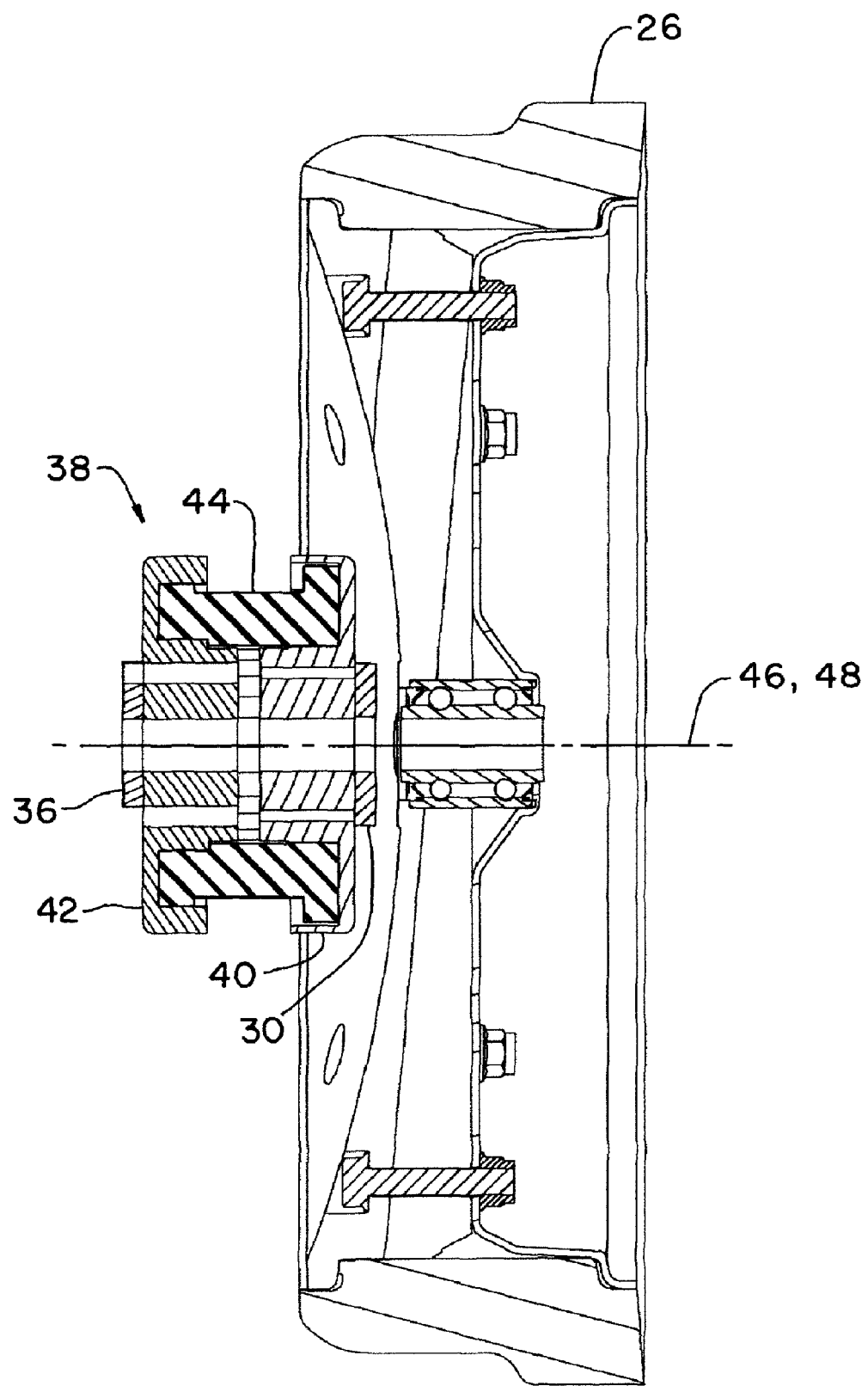
FIG. 3 is a cross-sectional view of a gauging wheel and the biasing system of the present invention used in the closing system of FIGS. 1 and 2.

Referring now to the drawings, and more particularly to FIGS. 1-3 there is shown an agricultural system 10 including a tractor 12 and a seeding machine 14. Seeding machine 14 is a row crop planter 14, but could be in the form of a grain drill. Tractor 12 provides the motive power for planter 14 and the mechanisms therein. Seeding machine 14 includes at least one tool bar 16 having multiple row units 18 attached thereto.

Each row unit 18 includes a seed metering system 20 and a seed placement system 22. Seed is supplied to seed metering system 20 by way of a seed supply and the seed is pooled over a portion of a seed disk contained therein. The seed disk operates to separate and position singular seeds that are then conveyed to seed placement system 22. Seed placement system 22 may be in the form of a gravity drop seed system or may be configured differently, such as a power drop seed system with a powered wheel, etc. The seeds are dropped into a trench formed by an opening system associated with each row unit 18.

Each row unit 18 includes a double disk furrow opener 24, gauge wheels 26 and closing wheels 28. Furrow opener disk 24 creates the trench into which seed placement system 22 delivers seed. The depth of the trench is governed by the positioning of gauge wheels 26 relative to furrow opener disk 24. Closing wheels 28 are positioned and apply pressure to the sides of the trench and the ground close to the trench to reposition the soil over the seed at a desired depth as the planting operation proceeds.

Row units 18 additionally include gauge wheel arms 30, adjustment links 32, closing wheel arms 36 and a biasing assembly 38. Gauge wheel arms 30 are connected in a rotational manner to a furrow opener disk 24. It is to be understood that the opposite side of row unit 18 may have mirror image elements relating to those shown in the foreground of FIG. 2. The mirror images of items 24-38, may be referred to in the singular, but are also applicable to those mirrored items on the opposite side of row unit 18. Adjustment link 32 is connected to gauge wheel arm 30 to thereby adjust the depth of the trench created by furrow opening disk 24. Gauge wheel arm 30 is connected to an axle that extends through furrow opener disk 24 about an axis 34. Biasing assembly 38 is connected between gauge wheel arm 30 and closing wheel arm 36. Biasing assembly 38 provides a rotational bias about axis 48 to thereby apply a downward bias to closing wheels 28. Gauge wheel 26 is rotatably coupled about axis 46 to gauge wheel arm 30 about an axle that has been omitted for the purposes of clarity along with the attaching hardware.

Biasing assembly 38 includes a toothed flange 40 and a toothed flange 42 having a resilient coupler 44 connected therebetween. Although teeth are referred to as a part of flanges 40 and 42, it is to be understood that the features of flanges 40 and 42 as well as resilient coupler 44 are digitated and that as they interact they become interdigitated. Teeth that extend from toothed flanges 38 and 40 interact with complimentarily positioned teeth in resilient coupler 44. As is illustrated the teeth on resilient coupler 44 as well as the teeth in toothed flanges 40 and 42 interact on the inside and outside diameter surfaces of resilient coupler 44. The adjustment of the biasing force applied to closing wheels 28 is determined by the rotational positioning of toothed flanges 40 and 42 relative to resilient coupler 44 and/or a spring constant of resilient coupler 44. For example, to increase the downward biasing force on closing wheel 28, toothed flange 42, which is attached to closing wheel arm 36 can be rotated in a clockwise direction before being assembled to resilient coupler 44. In a complimentary manner biasing force on closing wheel 28 can be reduced by repositioning toothed flange 42 and/or toothed flange 40. To achieve a balanced tension on the opposite side of row unit 18 biasing assembly 38 on the opposite side of row unit 18 will be rotated in an opposite direction to biasing assembly 38 illustrated in the foreground of FIG. 2.

Resilient coupler 44 is made of a flexible material that provides a torsional bias within biasing assembly 38. The flexible material may be an elastomer, such as a rubber or any synthetic or natural material that returns to substantially the same shape once a torsional force is removed therefrom. The partial containment of resilient coupler 44 within flanges 40 and 42 serves to define which portion of resilient coupler 44 flexes when a torsional force is applied to flanges 40 and 42. While resilient coupler 44 has been illustrated as being of a monolithic construct, it is also contemplated that portions of resilient coupler 44 may include relatively inflexible components that have a resilient coupling molded thereto. For example, the toothed portions may be made of a metal construct and a flexible elastomer may be molded thereto or connected therebetween.

Gauge wheel 26 rotates about an axis 46 and biasing assembly 38 is pivotally coupled about axis 48. Axes 46 and 48 are substantially parallel and may be coaxially located. Closing wheel 28 is rotationally coupled to an end of closing wheel arm 36 opposite biasing assembly 38 and is biased downwardly thereby.

While biasing assemblies 38 may act independently on each of closing wheels 28, it is also contemplated that a common axle 64 may be present through closing wheels 28 and may extend through both closing wheel arms 36, at a predetermined angle, thereby allowing biasing assemblies 38 on each side of row unit 18 to be coupled, each of which providing a downward bias to closing wheels 28 in a coordinated manner. Further, closing wheels 28 may be rotatably connected to each other and a single closing wheel arm 36 can provide the downward bias from a single biasing assembly 38.

Figure 4:
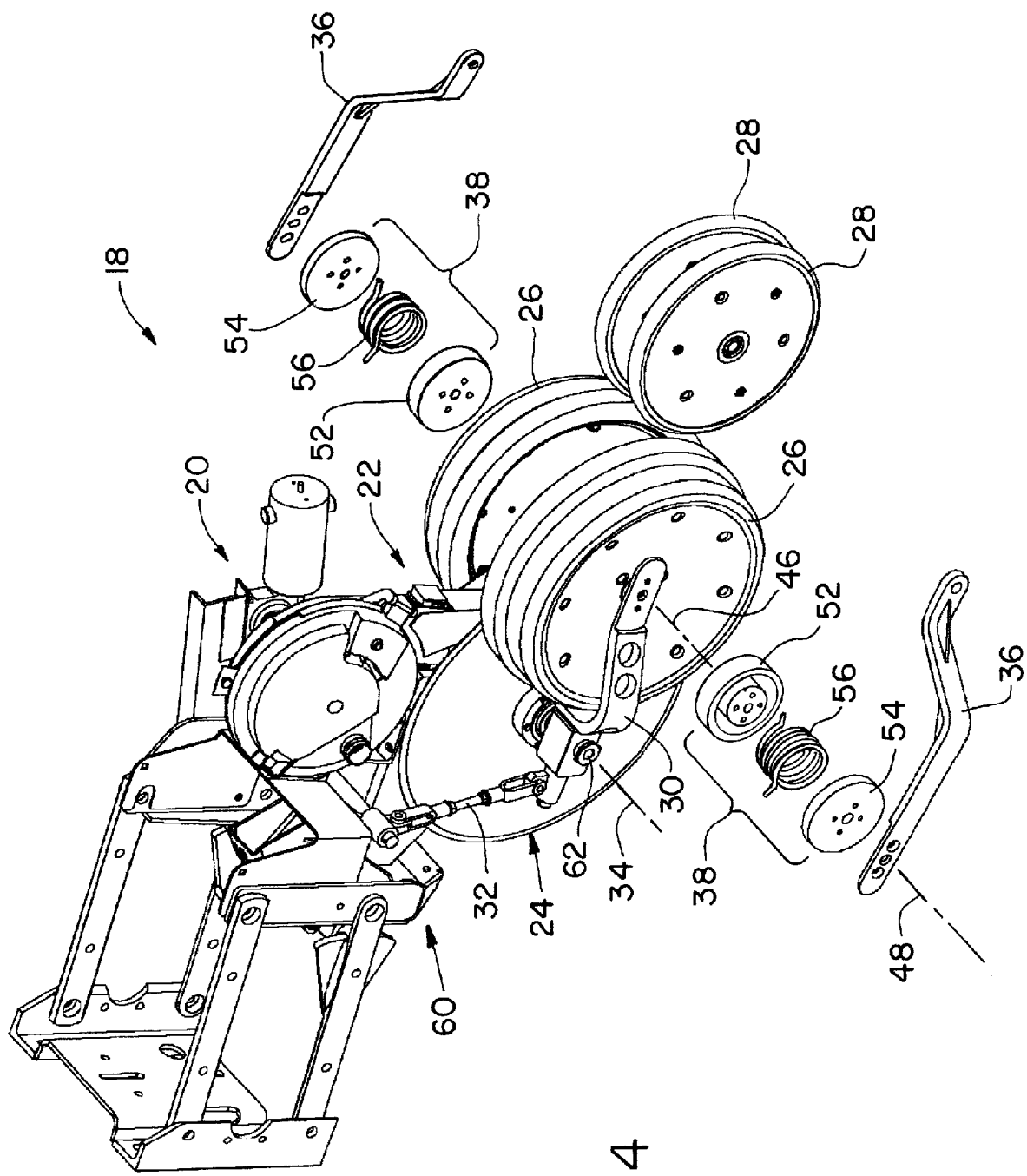
FIG. 4 is a perspective, partially exploded view of another embodiment of the biasing system used by the closing system of the seeding machine of FIG. 1.

Now, additionally referring to FIG. 4, there is shown another embodiment of the present invention substantially similar to that shown in FIG. 2 with biasing assembly 38 including flanges 52 and 54 with a torsion spring 56 enclosed therein. In this embodiment of the present invention the downward force can be applied to closing wheels 28 by way of torsion spring 56 that is positioned and biased by the positioning of flanges 52 and 54 relative to gauge wheel arm 30 and closing wheel arm 36.

The present invention advantageously eliminates structure above closing wheels 28 and provides an independent suspension system for the closing wheel system. Arms 30 and 36 can be thought of as suspension structures 30 and 36. Biasing assemblies 38 interact between arms 30 and 36 to provide a bias to the independent suspension of closing wheels 28. Frame 60 of row unit 18 has an axle 62 extending therefrom. Opening wheels 24 rotate about axle 62. Suspension structure 30 is pivotally attached to axle 61 and may be constrained in rotational position by adjustment device 32. Suspension structure 36 is pivotally attached to a portion of suspension structure 30, to gauge wheel 26 or to an axle that extends from gauge wheel 26, the attachment of which may be coaxial with gauge wheels 26. Suspension structure 36 is rotationally coupled to closing wheel 28.

Closing wheel arms 36 may be connected to various parts of row unit 18, which can be succinctly expressed as closing wheel arms 36 being carried by frame 60, since frame 60 provides the structural connection of row unit 18 to tool bar 16. Closing wheel arms 36 can be independently coupled to a corresponding closing wheel 28 to allow independent pivoting of closing wheel arms 36 in a biased or unbiased manner.

Having described the preferred embodiment, it will become apparent that various modifications can be made without departing from the scope of the invention as defined in the accompanying claims.

The invention claimed is:

1. An agricultural seeding machine, comprising:
   at least one tool bar; and
   a plurality of row units attached to said at least one tool bar, each said row unit including:
   a frame;
   a plurality of ground engaging wheels including a first ground engaging wheel;
   at least one suspension structure including a first suspension structure having a first end and a second end, said first end rotatably coupled to said first ground engaging wheel; and
   a torsional biasing device coupled to said second end of said first suspension structure, said torsional biasing device being carried by said frame, said torsional biasing device including:
   at least one digitated flange; and
   a flexible component having a digitated portion interdigitally coupled with said at least one digitated flange.

2. The agricultural seeding machine of claim 1, wherein said at least one digitated flange includes a first digitated flange and a second digitated flange, said flexible component having a first digitated portion and a second digitated portion, said first digitated portion being interdigitally coupled with said first flange and said second digitated portion being interdigitally coupled with said second flange, said first flange being connected to said first suspension structure, said second flange being carried by said frame.

3. The agricultural seeding machine of claim 1, wherein said torsional biasing device includes at least one of a resilient elastomer component and a torsion spring.

4. The agricultural seeding machine of claim 1, wherein said plurality of ground engaging wheels includes a second ground engaging wheel, said first and said second ground engaging wheels being closing wheels both of which are rotatably coupled to said first end of said first suspension structure.

5. The agricultural seeding machine of claim 4, wherein said at least one suspension structure includes a second suspension structure, said plurality of ground engaging wheels includes a third ground engaging wheel rotatably coupled to said second suspension structure, said second suspension structure being pivotally connected to said frame.

6. The agricultural seeding machine of claim 5, wherein said torsional biasing device is coupled to said second end of said first suspension structure and is also coupled to said second suspension structure.

7. The agricultural seeding machine of claim 6, wherein said torsional biasing device pivots about a pivotal axis, said third ground engaging wheel being a gauging wheel rotatable about a rotational axis, said pivotal axis and said rotational axis being substantially parallel.

8. The agricultural seeding machine of claim 7, wherein said pivotal axis and said rotational axis are coaxial with each other.

9. The agricultural seeding machine of claim 1, further comprising an other torsional biasing device, said at least one suspension structure includes a second suspension structure having a first end and a second end, said plurality of ground engaging wheels including a second ground engaging wheel, said second ground engaging wheel being rotatably coupled to said first end of said second suspension structure, said second end of said second suspension structure being coupled to said other torsional biasing device, said other torsional biasing device also being carried by said frame, said first ground engaging wheel and said second ground engaging wheel being closing wheels.

10. A row unit connectable to a tool bar of an agricultural seeding machine, the row unit comprising:
   a frame;
   a plurality of ground engaging wheels including a first ground engaging wheel, a second ground engaging wheel and a third ground engaging wheel, both said first ground engaging wheel and said second ground engaging wheel being closing wheels;
   at least one suspension structure including a first suspension structure and a second suspension structure, said first suspension structure having a first end and a second end, said first end rotatably coupled to said first ground engaging wheel and to said second ground engaging wheel, said third ground engaging wheel being rotatably coupled to said second suspension structure, said second suspension structure being pivotally connected to said frame; and
   a torsional biasing device coupled to said second end of said first suspension structure, said torsional biasing device being carried by said frame, said torsional biasing device being coupled to said second end of said first suspension structure and is also coupled to said second suspension structure, said torsional biasing device pivots about a pivotal axis, said third ground engaging wheel being a gauging wheel rotatable about a rotational axis, said pivotal axis and said rotational axis being substantially parallel.

11. The row unit of claim 10, wherein said torsional biasing device includes:
   at least one digitated flange; and
   a resilient component having a digitated portion interdigitially coupled with said at least one digitated flange.

12. The row unit of claim 11, wherein said at least one digitated flange includes a first digitated flange and a second digitated flange, said resilient component having a first digitated portion and a second digitated portion, said first digitated portion being interdigitally coupled with said first flange and said second digitated portion being interdigitally coupled with said second flange, said first flange being connected to said first suspension structure, said second flange being carried by said frame.

13. The row unit of claim 10, wherein said torsional biasing device includes:
   at least one flange; and
   a torsion spring coupled with said flange.

14. The row unit of claim 10, wherein said pivotal axis and said rotational axis are coaxial with each other.

15. The row unit of claim 10, further comprising an other torsional biasing device, said second suspension structure having a first end and a second end, said second ground engaging wheel being rotatably coupled to said first end of said second suspension structure, said second end of said second suspension structure being coupled to said other torsional biasing device, said other torsional biasing device also being carried by said frame.

16. An agricultural seeding machine, comprising:
   at least one tool bar; and
   a plurality of row units attached to said at least one tool bar, each said row unit including:
      a frame;
      a plurality of ground engaging wheels including a first closing wheel, a second closing wheel and a gauging wheel having an axis of rotation; and
      a plurality of suspension structures including a first suspension structure and a second suspension structure each having a first end and a second end, said first end of said first suspension structure being rotatably coupled to said first closing wheel, said first end of said second suspension structure being rotatably coupled to said second closing wheel, said second ends of said first suspension structure and said second suspension structure being carried by said frame, said second ends being coaxially pivotable about said axis.

17. The agricultural seeding machine of claim 16, further comprising:
   a first torsional biasing device coupled to said second end of said first suspension structure, said first torsional biasing device being carried by said frame; and
   a second torsional biasing device coupled to said second end of said second suspension structure, said second torsional biasing device being carried by said frame.

* * * * *